United States Patent
Hansen et al.

(10) Patent No.: US 10,795,566 B1
(45) Date of Patent: Oct. 6, 2020

(54) TWO DIMENSIONAL EVIDENCE VISUALIZER

(71) Applicant: Mineset, Inc., Milpitas, CA (US)

(72) Inventors: Marc David Hansen, Morgan Hill, CA (US); Barry G. Becker, Union City, CA (US)

(73) Assignee: Mineset, Inc., Milpitas, CA (US)

( * ) Notice: Subject to any disclaimer, the term of this patent is extended or adjusted under 35 U.S.C. 154(b) by 0 days.

(21) Appl. No.: 15/996,815

(22) Filed: Jun. 4, 2018

Related U.S. Application Data

(60) Provisional application No. 62/515,479, filed on Jun. 5, 2017.

(51) Int. Cl.
| | |
|---|---|
| *G06T 11/20* | (2006.01) |
| *G06F 3/0485* | (2013.01) |
| *G06F 3/0482* | (2013.01) |
| *G06T 13/80* | (2011.01) |

(52) U.S. Cl.
CPC ........ *G06F 3/04855* (2013.01); *G06T 11/206* (2013.01); *G06F 3/0482* (2013.01); *G06T 13/80* (2013.01)

(58) Field of Classification Search
CPC ...... G06T 11/206; G06T 11/20; G06F 3/0481; G06F 17/246; H04L 41/22
USPC .......................................................... 345/440
See application file for complete search history.

(56) References Cited

U.S. PATENT DOCUMENTS

| | | | |
|---|---|---|---|
| 5,930,803 A | 7/1999 | Becker et al. | |
| 6,460,049 B1 | 10/2002 | Becker et al. | |
| 6,873,325 B1* | 3/2005 | Kontkanen | G06K 9/6232 345/440 |
| 2009/0089709 A1* | 4/2009 | Baier | G05B 19/409 715/817 |
| 2012/0239380 A1* | 9/2012 | Cumby | G06F 17/2785 704/9 |
| 2016/0034948 A1* | 2/2016 | Zhong | G06Q 30/0246 705/14.45 |
| 2017/0308795 A1* | 10/2017 | Grom | G06N 5/022 |

* cited by examiner

*Primary Examiner* — Gordon G Liu
(74) *Attorney, Agent, or Firm* — Nutter McClennen & Fish LLP

(57) ABSTRACT

An apparatus has an input configured to obtain various categories of naïve Bayes model data, and a formatter operatively coupled with the input. The formatter is configured to generate a format for displaying the naïve Bayes model data on a display device. The apparatus also has a displayer operatively coupled with the formatter. The displayer is configured to display the naïve Bayes model data in a two dimensional manner in the format on the display device. In addition, the displayer also is configured to display a navigation tool for maneuvering the displayed naïve Bayes model data on the display device when the displayed naïve Bayes model data is too wide to display on the display device.

21 Claims, 4 Drawing Sheets
(3 of 4 Drawing Sheet(s) Filed in Color)

TWO DIMENSIONAL EVIDENCE VISUALIZER

PRIORITY

This patent application claims priority from provisional U.S. Patent Application No. 62/515,479, filed Jun. 5, 2017, entitled, "Two Dimensional Evidence Visualizer," and naming Marc David Hansen and Barry G. Becker as inventors, the disclosure of which is incorporated herein, in its entirety, by reference.

TECHNICAL FIELD

Various embodiments relate to computer graphics processing and selective visual display systems, and more particularly to displaying in an easier to visualize manner a two dimensional evidence visualizer that provides selective Bayesian analysis of data.

BACKGROUND ART

It is known in the art to provide three dimensional visualizations of structured data. For example, in U.S. Pat. No. 5,930,803, issued Jul. 27, 1999, and U.S. Pat. No. 6,460,049, issued Oct. 1, 2002 (the contents of which are incorporated by reference in their entireties) there is provided a method, system, and computer program product for visualizing an evidence classifier using three dimensional pie charts. A sample display from this computer program is shown in FIG. 1. The pie charts are placed in a three dimensional environment that a user may rotate, zoom, or pin. In this way, the tool permits a user to visualize naïve Bayes model data in a comfortable spatial environment. Moreover, the tool permits comparison at a glance between the relative importance of model data, by simply viewing the heights of the different pie charts—taller charts have more associated data, and therefore reflect more important trends. While this visualization tool is able to present a flexible, three dimensional visualization of model data, it displays the three dimensional model data in a manner that is not suited for ease of use by the less technically or spatially inclined. In particular, navigating through a three dimensional environment may not be as intuitive as navigating a two dimensional environment, such as a web page.

Visualization of structured numerical data may involve display using bar charts. A bar chart is useful when a data model provides a collection of "bins", and a value or count of occurrences related to each bin. For example, a histogram is a bar chart that shows a rectangle for each bin having a fixed width along an x-axis, and having a height along a y-axis equal to the count of occurrences for that bin. Histograms are useful for displaying discrete distributions of data, such as a count of students in each grade of a school.

A stacked bar chart may be used to display data having multiple types of counts for each bin, or more generally any data having two dimensions. For example, students may be classified into grades in one dimension, and into those having a grade point average (GPA) under 2.0, those having a GPA between 2.0 and 3.0, and those having a GPA above 3.0 in a second dimension. In this case, a histogram may be shown as a stacked bar chart having a mosaic of rectangles. To be concrete, the histogram may show along the x-axis, for each grade of student, multiple rectangular segments stacked atop each other, where the height of each segment corresponds to the count of the class of student. Each rectangle may have a different color. A spinogram is a stacked bar chart where the height of the segments for each bin is the same, but the width of the segments is proportional to the count of occurrences for that bin. Thus, while a histogram is useful for comparing overall counts of occurrences between different bins, a spinogram is useful for comparing the relative fractions of occurrences between different bins.

However, a unique set of technical challenges appears when attempting to display three-dimensional model data in an evidence visualizer using simplified graphical displays and navigation. In particular, it is no longer possible to pan or zoom a three dimensional landscape, so the relevant data must be properly positioned on a viewing screen. If the data are complex and there are many different aspects by which the underlying evidence model is viewed, they may not all fit on a viewing screen at the same time, so it becomes difficult to immediately visually determine which evidence is most important to predicting a corresponding outcome. Also, the viewing space may be limited by the size of the device display, especially on a mobile device such as a smartphone, so the most economical use must be made of the available two dimensional viewing space, a problem that does not occur in the prior art three dimensional environment.

SUMMARY OF ILLUSTRATIVE EMBODIMENTS

Therefore, various embodiments of the present invention provide a technical solution to this technical visualization issue. Specifically, illustrative embodiments provide a system and method for displaying naïve Bayes model data in a two dimensional manner that is easy to manipulate and understand. Illustrated embodiments show data using stacked bar charts as either histograms or spinograms. If a bar chart is too wide to be shown in the display area, a horizontal slider bar or range slider is provided for just that chart, while if there are too many charts to be shown in the display area, a vertical slider bar is provided. A fixed header is displayed that shows the distribution of records for each category or class of data as a total over the entire data set, while individual categories may be sorted vertically according to various criteria. Each category is displayed with its relative predictive strength as an importance indicator. Individual bins within each category may be selected to perform a Bayesian analysis on the data set using the selected bin or bins as a prior condition. Animations are provided that show the effect of the selection during the what-if analysis, including any rearrangement of the importance of the categories.

In accordance with another embodiment, an apparatus has an input configured to obtain various categories of naïve Bayes model data, and a formatter operatively coupled with the input. The formatter is configured to generate a format for displaying the naïve Bayes model data on a display device. The apparatus also has a displayer operatively coupled with the formatter. The displayer is configured to display the naïve Bayes model data in a two dimensional manner in the format on the display device. In addition, the displayer also is configured to display a navigation tool for maneuvering the displayed naïve Bayes model data on the display device when the displayed naïve Bayes model data is too wide to display on the display device.

BRIEF DESCRIPTION OF THE DRAWINGS

The patent or application file contains at least one drawing executed in color.

Copies of this patent or patent application publication with color drawing(s) will be provided by the Office upon request and payment of the necessary fee.

Figure 1:
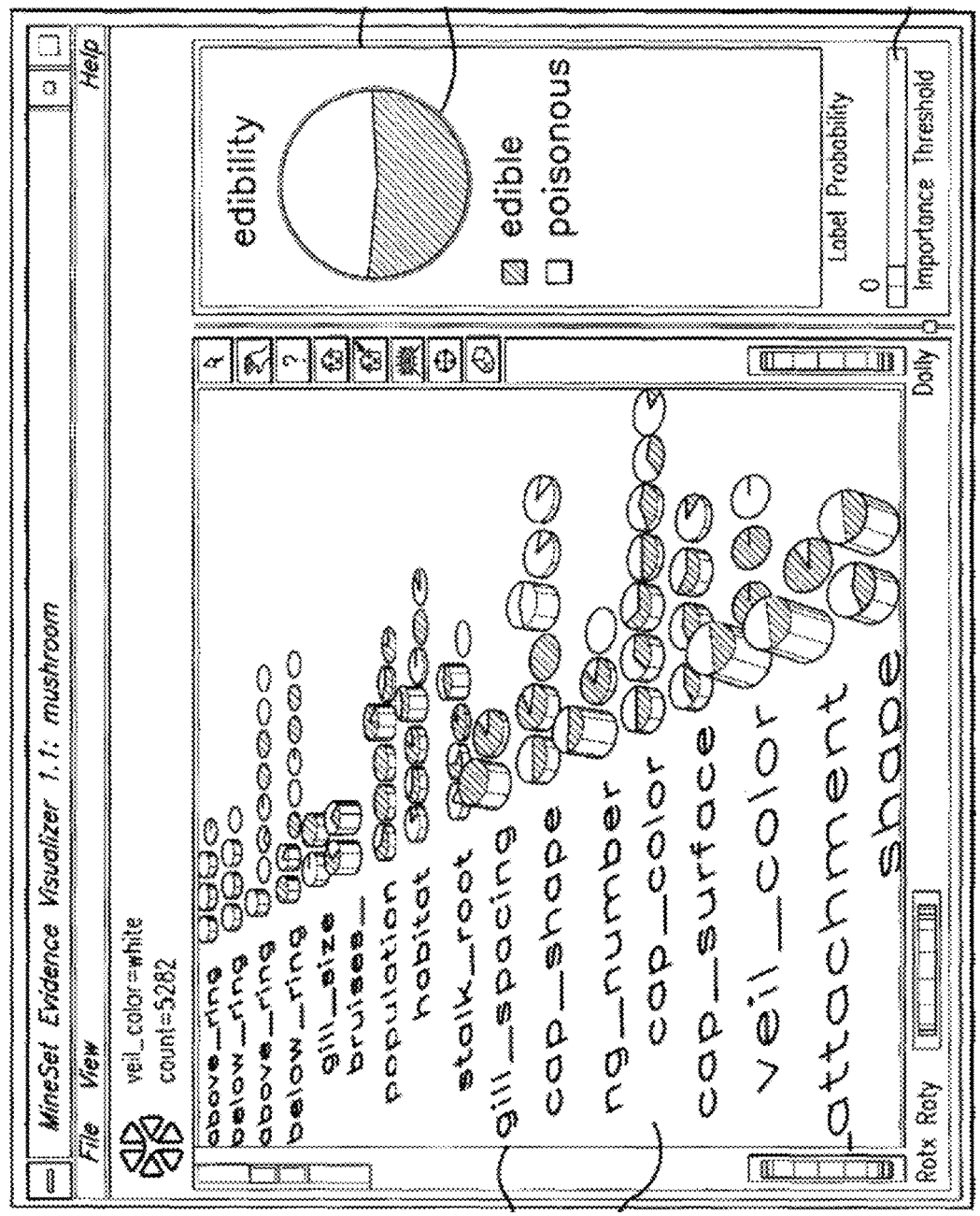
Figure 2:
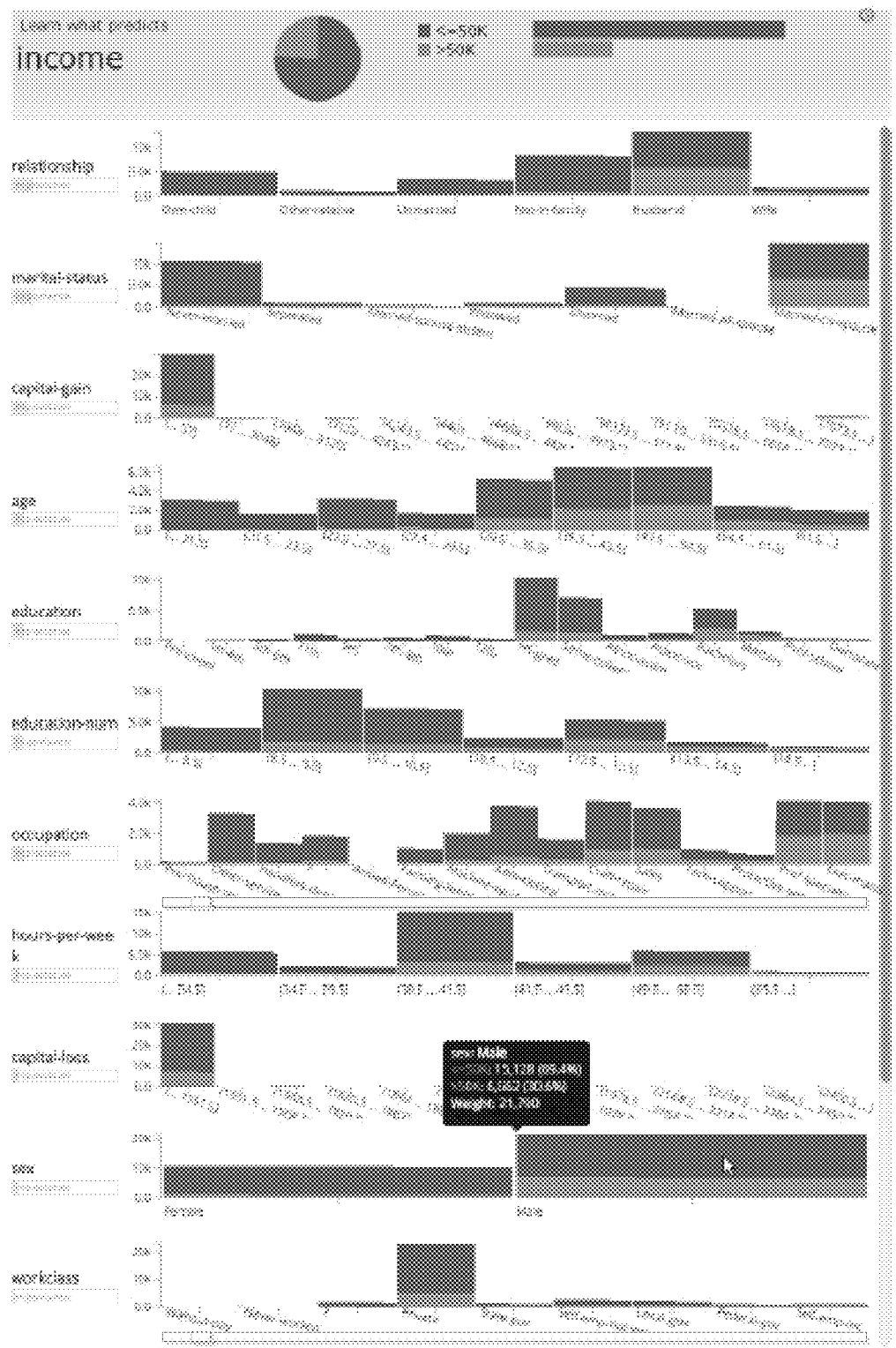
Figure 3:
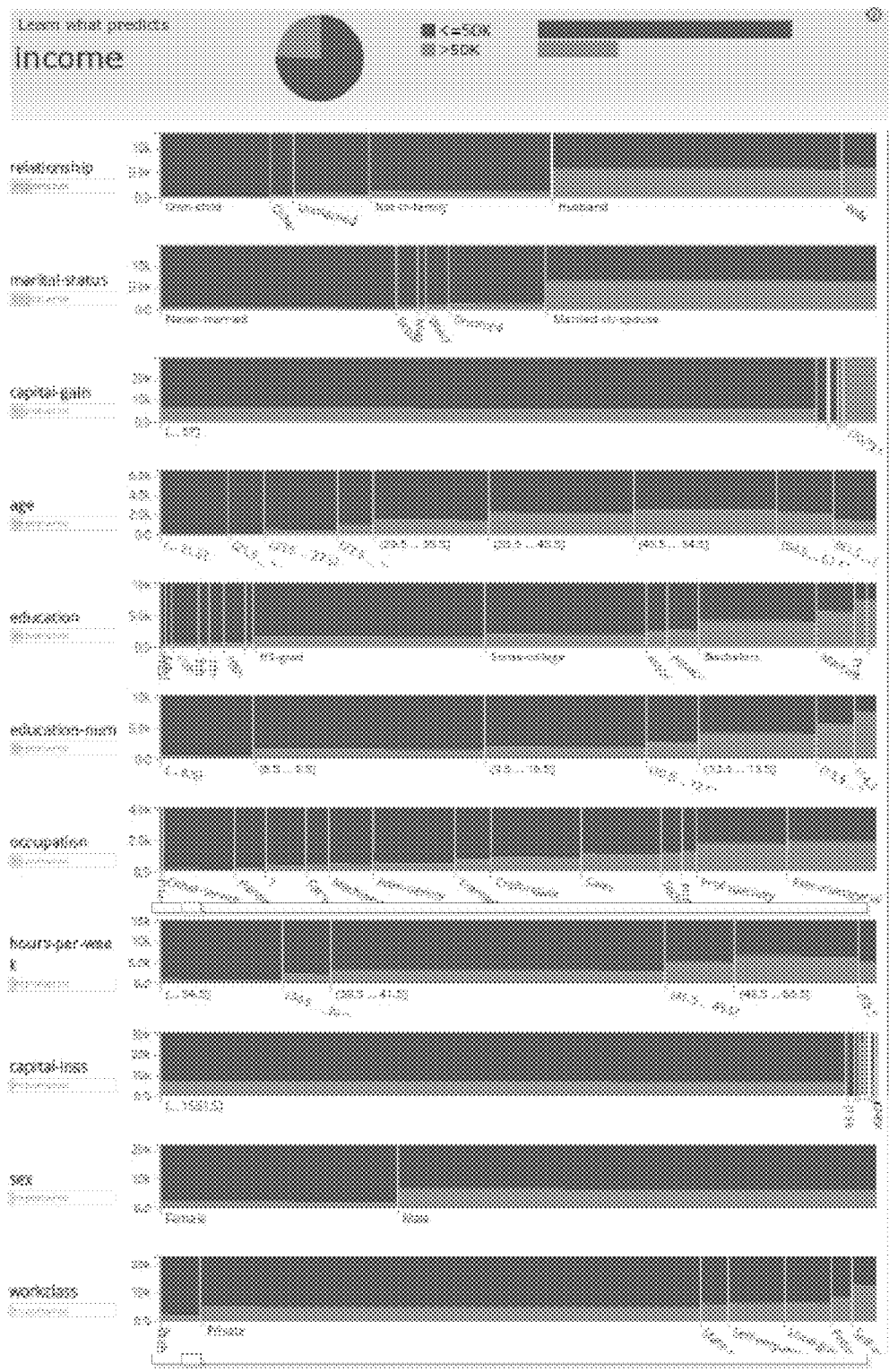
Figure 4:
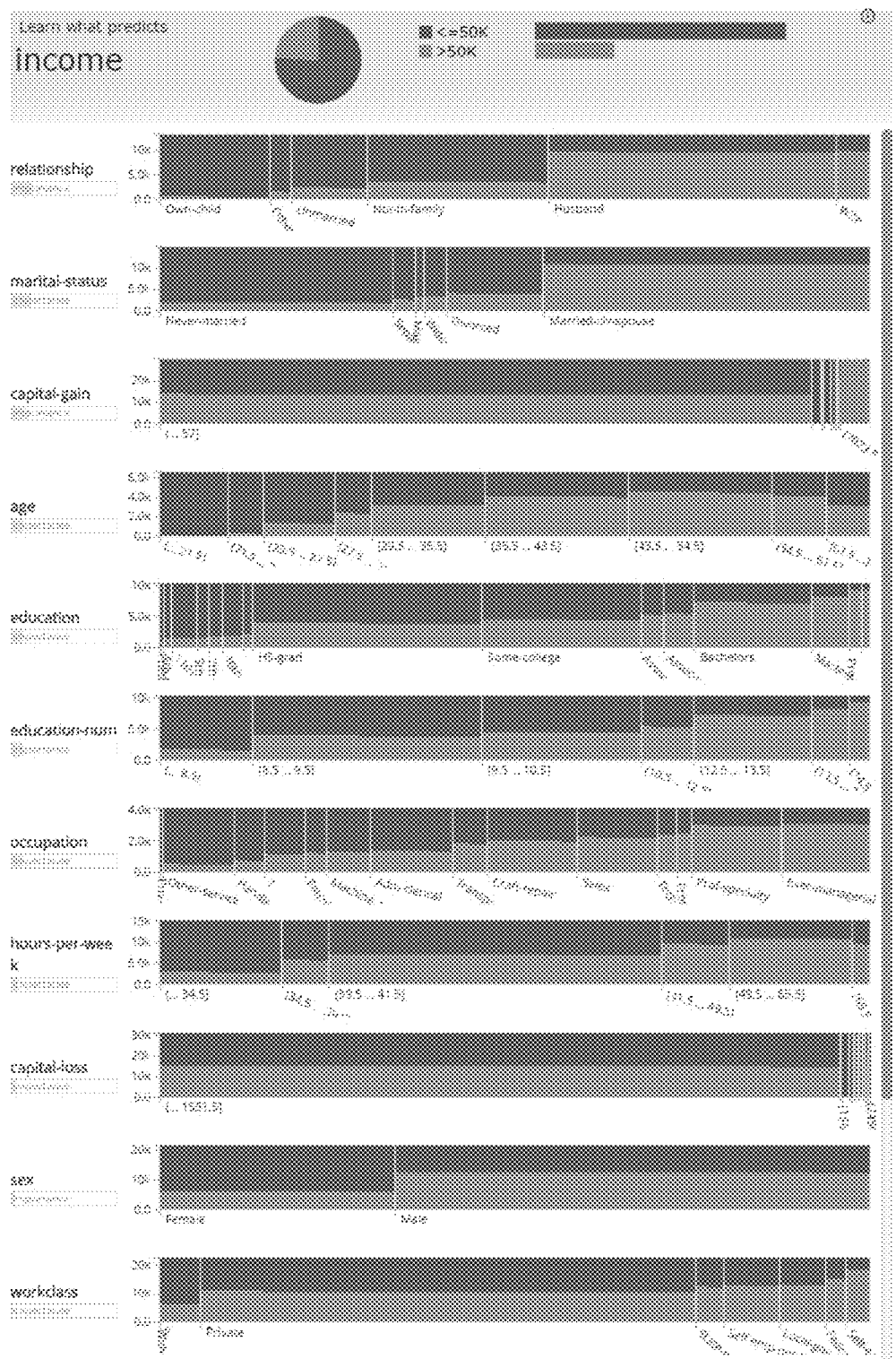

The foregoing features of embodiments will be more readily understood by reference to the following detailed description, taken with reference to the accompanying drawings, in which:

FIG. 1 shows a prior art display screen having a three dimensional visualization of naïve Bayes model data;

FIG. 2 shows a display screen having a two dimensional histogram visualization of model data for an adult census according to an embodiment of the invention that permits simple visual comparison of the data;

FIG. 3 shows a display screen having a two dimensional spinogram visualization of the model data of FIG. 3 according to an embodiment of the invention; and FIG. 4 shows a display screen having a two dimensional spinogram visualization of normalized model data according to an embodiment of the invention.

DETAILED DESCRIPTION OF SPECIFIC EMBODIMENTS

Various embodiments of the invention present invention permit display of multivariate data in a two dimensional environment, such as a web page on a smartphone. The embodiments therefore represent an improvement over the evidence visualizer disclosed in U.S. Pat. Nos. 5,930,803 and 6,460,049.

FIG. 2 shows a display screen having a two dimensional histogram visualization of naïve Bayes model data for an adult census according to an embodiment of the invention that permits simple visual comparison of the data. FIG. 2 shows the combined census data for a collection of adults broken out by various categorical aspects, including: relationship status, marital status, age, maximum educational level, years of education, occupation, hours worked per week, gender, and category of employer. As can be understood from viewing FIG. 2, each of these categories is itself divided into various bins into which each adult has been uniquely placed.

Certain features of FIG. 2 should be appreciated that provide an advantage over the prior art three dimensional display. Stacked bar charts are used to indicate the raw counts for each bin, rather than three dimensional pie charts. However, because the number of occupations is larger than may fit on a single screen, a slider bar appears, permitting a viewer to scroll just that individual category. Another slider bar appears for the category of employer, or work class, permitting the viewer to scroll just that category. In this way, the screen space is optimized to compensate for the loss of the "fly-over" aspect of the prior art tool. A viewer may configure the improved evidence visualizer to have a minimum width for each categorical bin, so that the slider bar appears only when the total width of all bins is greater than the width of the display screen. To compensate for a loss of information due to the small screen space available to each row, the individual stacked bar charts may be rendered using a "pixel perfect" algorithm, as disclosed in U.S. provisional application 62/143,493, filed Apr. 6, 2015.

Another feature present in FIG. 2 is a fixed header that indicates a target aspect of the data set that is being predicted—in this case, the income of each surveyed adult. A "fixed" header remains fixed and unmoving at the top of a viewing screen when the screen is vertically scrolled. The fixed header includes a pie chart and a grouped bar chart that show a distribution of incomes according to two pre-defined bins—in this case, whether the adult earned more than, or no more than, $50,000—and the fraction of adults that earned amounts in these income categories. The pie chart shows that everything sums to a whole, while the bars allow for easier comparison of differences between values. It should be appreciated that this Figure is only exemplary, that other demographic information could be extracted from census data, that the target attribute can be provided any number of bins, and that any data set may used in accordance with an embodiment to predict any particular emergent feature of the data, as defined by the particular application for which the data are used.

Another feature shown is that the relative "importance" of each category is indicated next to the name of the category. As used herein, the importance of a category is the relative predictive strength of that category in relation to a target statistic; that is, how correlated the various bins in that category are with the target. Thus, in FIG. 2, the factor most correlated factor with the income of an individual (and hence the most "important" and best predictive) is the individual's relationship to others, while the fourth most correlated factor is the person's age. Using these visual indicators, one can quickly see that those making over $50,000 per year are most likely: men, married with children, between 29.5 and 61.5 years old, and who have graduated high school. But one can also see that being a married husband is a stronger predictor of that income bracket than age or educational attainment, a result that is perhaps unexpected. A slider bar is provided to scroll vertically in case there are more categories than can fit within the display screen space.

Any individual bin for any given attribute may be selected by a user. The data are then filtered using that selection, permitting the user to perform a "what-if" analysis that shows the distribution of data assuming that only data from the selected bin are considered. In particular, the class distribution changes as the user selects attribute values during what-if analysis, so certain categories may become more important or less important. Thus, if only high school graduates are considered, the status of husband may become less important. The model data may be sorted in this way using any number of pre-identified bins.

Moreover, as individual bins are selected to submit the data to particularized consideration, animations may be provided to transition from one view to another so that the user advantageously can understand how things changed between views. In particular, the pie chart and the grouped bar chart in the header may show an animation between the pre-selection (or a priori) evidence display and the post-selection (or a posteriori) evidence display. Animations also may be shown when sorting the model data based on its various attributes. Thus, the display of the model data may show stacked bar charts moving from a pre-selection position to a post-selection position.

Data categories may be sorted vertically within the screen space alphabetically, by importance, by total number of data points, or by any other suitable criterion. Data categories may be sorted horizontally alphabetically, numerically by bin count in ascending or descending order, or by any other suitable criterion. Various other features may be appreciated, such as coloring each portion of a displayed attribute count with a "tool tip" having the same color as the target attribute.

Embodiments of the invention are not limited to displaying histograms. FIG. 3 shows a display screen having a two dimensional spinogram visualization of the model data of FIG. 3 according to an embodiment of the invention. In contrast to FIG. 2, in which histograms permit a viewer to easily compare the absolute counts in various bins within each categorical attribute, the spinograms of FIG. 3 permit the viewer to easily compare the relative percentages of the target attribute appearing in each bin. Thus, one can easily see from FIG. 3 that about half of wives make over $50,000 per year, and that a higher fraction of wives make that amount than do husbands, a fact not easily discernable from FIG. 2 due to the relatively small count of wives. At the same time, a higher fraction of men than women make over $50,000, although it is also readily apparent that this fact is not as strong a predictor of earnings as familial relationship. Similarly, one can easily see from FIG. 3 that there is a positive correlation between the level of education attained and the fraction of those attaining it who make more money, and that a similar correlation exists with the number of years of education.

FIG. 4 shows a display screen having a two dimensional spinogram visualization of normalized model data according to an embodiment of the invention. The display screen of FIG. 4 uses the same underlying data, but these data have been normalized by the prior probability of the target attribute itself—in this case income. Normalizing the data adjusts the relative value given to each data point so that rarer data points are given a higher weight and commoner data points are given a lower weight. In this way, the (normalized) count for each bin of the target attribute occurs with equal frequency in each evidence category. In this way, rare or outlier data can be viewed as more important, providing further insight into the underlying data set. It should be appreciated that one may apply the normalization process to the histogram of FIG. 2, to produce a normalized histogram, and not deviate from the scope of the invention.

The embodiments of the invention described above are intended to be merely exemplary; numerous variations and modifications will be apparent to those skilled in the art. All such variations and modifications are intended to be within the scope of the present invention as defined in any appended claims.

Various embodiments may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

What is claimed:

1. An apparatus comprising:
an input configured to obtain naïve Bayes model data comprising values and associated attributes and a plurality of categories of the attributes and a target statistic of the naïve Bayes model data, each category comprising a plurality of different attributes;
a formatter operatively coupled with the input, the formatter being configured to generate a format for displaying the naïve Bayes model data on a display device, wherein the format includes each category defining a plurality of bins, each bin representing one or more attributes of the plurality of different attributes of the category and comprising values of the data having the one or more attributes; and
a displayer operatively coupled with the formatter, the displayer being configured to display the naïve Bayes model data in a two-dimensional manner in the format on the display device as a visual indication of the target statistic present in the naïve Bayes model data and the plurality of categories, wherein each category is displayed as the plurality of bins and an indication of the relative predictive strength of the category in relation to the target statistic, wherein each bin is displayed as a first visual indication of the target statistic distribution present in the values of the bin and as a second visual indication of the distribution of the one or more attributes of the bin in the category, the displayer also being configured to display a navigation tool for maneuvering the displayed naïve Bayes model data on the display device.

2. The apparatus of claim 1 wherein the navigation tool comprises a slider bar.

3. The apparatus of claim 1 further comprising a categorizer operatively coupled with the displayer, the categorizer being configured to produce a distribution indicia identifying the distribution of the naïve Bayes model data across a plurality of individual categories, the displayer being configured to displaying the distribution indicia on the display device.

4. The apparatus of claim 1 where the displayer is configured to display the distribution data at a header or a footer.

5. The apparatus of claim 1 further comprising an animator coupled with the displayer to generate an animation to show the effect of selecting during a what-if analysis.

6. The apparatus of claim 1 wherein the display device comprises a smartphone.

7. The apparatus of claim 1,
wherein the input is configured to receive a user selection of one or more bins of the displayed plurality of bins as a filtering condition, and
wherein the display is configured to update the displayed naïve Bayes model data using the filtering condition as a filter.

8. A computer program product for use on a computer system, the computer program product comprising a tangible, non-transient computer usable medium having computer readable program code thereon, the computer readable program code comprising:
program code for obtaining naïve Bayes model data comprising values and associated attributes and a plurality of categories of the attributes, each category comprising a plurality of different attributes;
program code for receiving a target statistic of the naïve Bayes model data;
program code for generating a format for displaying the naïve Bayes model data on a display device, wherein the format includes each category having a plurality of bins, each bin representing one or more attributes of the plurality of different attributes of the category and comprising values of the data having the one or more attributes,
program code for displaying the naïve Bayes model data in a two-dimensional manner in the format on the display device as a visual indication of the target statistic present in the naïve Bayes model data and a plurality of categories, wherein each category is displayed as a plurality of bins and an indication of the relative predictive strength of the category in relation to the target statistic, wherein each bin is displayed as a first visual indication of the target statistic distribution present in the values of the bin and as a second visual indication of the distribution of the one or more attributes of the bin in the category; and
program code for displaying a navigation tool for maneuvering the displayed naïve Bayes model data on the display device.

9. The computer program product of claim 8 wherein the navigation tool comprises a slider bar.

10. The computer program product of claim 8 further comprising program code for producing distribution indicia identifying the distribution of the naïve Bayes model data across a plurality of individual categories, and program code for displaying the distribution indicia on the display device.

11. The computer program product of claim 8 where the program code for displaying the distribution indicia comprises program code for displaying the distribution data at a header or a footer.

12. The computer program product of claim 8 further comprising program code for generating and displaying on the display device an animation to show the effect of selecting during a what-if analysis.

13. The computer program product of claim 8 wherein the display device comprises a smartphone.

14. The computer program product of claim 8, comprising program code for:
receiving a user selection of one or more bins of the displayed plurality of bins as a filtering condition, and
updating the displayed naïve Bayes model data using the filtering condition as a filter.

15. A method comprising:
obtaining naïve Bayes model data comprising values and associated attributes and a plurality of categories of the attributes and a target statistic of the naïve Bayes model data, each category comprising a plurality of different attributes;
generating a format for displaying the naïve Bayes model data on a display device, wherein the format includes each category defining a plurality of bins, each bin representing one or more attributes of the plurality of different attributes of the category and comprising values of the data having the one or more attributes;
displaying the naïve Bayes model data in a two-dimensional manner in the format on the display device as a visual indication of the target statistic present in the naïve Bayes model data and a plurality of categories, wherein each category is displayed as the plurality of bins and an indication of the relative predictive strength of the category in relation to the target statistic, wherein each bin is displayed as a first visual indication of the target statistic distribution present in the values of the bin and as a second visual indication of the distribution of the one or more attributes of the bin in the category; and
displaying a navigation tool for maneuvering the displayed naïve Bayes model data on the display device.

16. The method of claim 15 wherein the navigation tool comprises a slider bar.

17. The method of claim 15 further comprising producing distribution indicia identifying the distribution of the naïve Bayes model data across a plurality of individual categories, and displaying the distribution indicia on the display device.

18. The method of claim 15 where displaying the distribution indicia comprises displaying the distribution data at a header or a footer.

19. The method of claim 15 further comprising generating and displaying on the display device an animation to show the effect of selecting during a what-if analysis.

20. The method of claim 15 wherein the display device comprises a smartphone.

21. The method of claim 15, further comprising:
receiving a user selection of one or more bins of the displayed plurality of bins as a filtering condition, and updating the displayed naïve Bayes model data using the filtering condition as a filter.

* * * * *